US006798633B1

(12) United States Patent
Rossbach

(10) Patent No.: US 6,798,633 B1
(45) Date of Patent: Sep. 28, 2004

(54) CIRCUIT ARRANGEMENT FOR OPERATION OF A RELAY

(75) Inventor: Martin Rossbach, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 151 days.

(21) Appl. No.: 10/049,459

(22) PCT Filed: Jul. 19, 2000

(86) PCT No.: PCT/DE00/02436

§ 371 (c)(1), (2), (4) Date: May 20, 2002

(87) PCT Pub. No.: WO01/13395

PCT Pub. Date: Feb. 22, 2001

(30) Foreign Application Priority Data

Aug. 13, 1999 (DE) ........................................ 199 39 650

(51) Int. Cl.[7] ................................................ H01G 47/00
(52) U.S. Cl. ........................ 361/152; 361/160; 361/170
(58) Field of Search ................................ 361/152, 160, 361/170

(56) References Cited

U.S. PATENT DOCUMENTS 4,326,234 A * 4/1982 Shuey ........................ 361/154
4,979,069 A * 12/1990 Simpson ...................... 361/31
5,107,391 A 4/1992 Siepmann
5,790,358 A * 8/1998 Kojima et al. ................ 361/63
6,388,854 B1 * 5/2002 Berstis et al. ................ 361/94
6,504,691 B1 * 1/2003 Matsui et al. ................ 361/38

FOREIGN PATENT DOCUMENTS

| | | |
|---|---|---|
| AT | 359 564 | 4/1980 |
| DE | 26 12 548 A1 | 9/1977 |
| DE | 26 11 982 B2 | 10/1977 |
| DE | 28 09 905 C2 | 9/1979 |
| DE | 196 54 378 A1 | 6/1998 |
| EP | 0 196 960 A1 | 10/1986 |

* cited by examiner

*Primary Examiner*—Anthony Dinkins
(74) *Attorney, Agent, or Firm*—Morrson & Foerster LLP

(57) ABSTRACT

The invention relates to a circuit arrangement for operation of a relay which provides a switching-on current for the field coil of the relay and subsequently, after a predetermined time, a holding current. In order that any possible discrepancies in the parameters of the relay from their nominal values have no negative influence and need not be taken into account when designing the circuit, and in order that the circuit arrangement can be used with operating voltages of different magnitude, at least one constant current source supplies the relay switching-on current and the relay holding current.

13 Claims, 1 Drawing Sheet

CIRCUIT ARRANGEMENT FOR OPERATION OF A RELAY

CLAIM FOR PRIORITY

This application claims priority to International Application No. PCT/DE00102436 which was published in the German language on Jul. 19, 2000.

TECHNICAL FIELD OF THE INVENTION

The invention relates to a circuit arrangement for operation of a relay, and in particular, to a current having a timer unit which provides a relay switching-on current for a time which is predetermined by the timer unit and which provides a relay holding current, which is less than the relay switching-on current for a subsequent holding period.

BACKGROUND OF THE INVENTION

U.S. Pat. No. 5,107,391 discloses a circuit arrangement in which the current flowing through at least one relay (i.e. its field coil) is controlled by means of an electronic switch in the form of a field-effect transistor. When it is switched on, the relay is supplied with a holding current throughout its holding period. The magnitude of the holding current is governed by the duty ratio of electrical pulses which drive the electronic switch. The temperature of the relay is measured by means of a temperature sensor, and the voltage which is applied to the field coil of the relay is measured by means of a voltage sensor. These measurement variables, as well as information which is stored in a function memory and relates to the nominal values of the relay, are used to define the duty ratio of the pulses, and thus to define the magnitude of the holding current. The relay nominal values must therefore be known in order to properly operate the circuit. A voltage change which occurs on the field coil of the relay is used to identify that the relay has been switched on, and causes a timer unit to be started. This timer unit uses a continuous pulse to switch on the electronic switch, so that a switching-on current flows which is sufficient to ensure that the relay is switched on. Once the time which is predetermined by the timer unit, and which must be longer than the time required for the relay that is being used to be switched on has elapsed, the continuous pulse ends, and the holding current, which is governed by the duty ratio of the pulses, still flows through the relay.

In order to ensure that a sufficient holding current flows to hold the relay in the switched-on state, the circuit takes account of the voltage across the field coil, the temperature and the nominal values for the relay. Individual discrepancies from the nominal values for the relay, in particular discrepancies in the coil resistance, are ignored, however. Discrepancies such as these can occur, for example, during the manufacture of the relay, due to aging processes during operation, or due to oxidation of conductors and contacts of the field coil.

Furthermore, although the circuit is able to take account of fluctuations in the operating voltage by measuring the voltage across the field coil of the relay, the circuit is, however, intended for operation from a voltage source with a predetermined nominal voltage, for example from a motor vehicle battery with a voltage of 12 V. Circuits with components of different sizes are therefore required to operate relays from different operating voltages.

SUMMARY OF THE INVENTION

One embodiment of the invention discloses a circuit arrangement for operation of a relay. Discrepancies in the relay from its nominal values have no effect on the magnitude of the switching-on current and holding current, and need not be taken into account with regard to the size of the components in the circuit. Furthermore, it is possible to use the cireuit, with one and the same relay, from operating voltages of different magnitude.

In this embodiment, the relay switching-on current and the relay holding current are constant currents, which are supplied from at least one constant current source. A constant current is thus used both as the relay switching-on current and as the relay holding current, whose magnitude is not influenced either by discrepancies in the relay from its nominal values or by operation of the circuit arrangement from operating voltages of different magnitude.

A constant current source whose constant current magnitude is variable can be used to supply the constant relay switching-on current and the constant, lower relay holding current. The constant current source supplies the relay switching-on current from the start of the switching-on process. Once the relay has been switched on and the time which is predetermined by the timer unit has elapsed, the constant current is reduced to the relay holding current.

In another embodiment of the invention, the cireuit arrangement includes, for example, a first constant current source which provides the relay holding current during the time which is predetermined by the timer unit and during the subsequent holding period, and a second constant current source which provides a constant current, which is superimposed on the relay holding current in order to form the relay switching-on current, during the time which is predetermined by the timer unit. This has the advantage that relatively simple constant current sources can be used, whose constant currents need not be variable.

In one aspect of the invention, a switch, which is closed during the time that is predetermined by the timer unit, can advantageously be located in the current path of the constant current provided by the second constant current source. Once this time has elapsed, the switch is opened, thus making it easy to switch between the relay switching-on current and the relay holding current.

In another aspect of the invention, the timer unit and/or the switch may require an auxiliary voltage. A voltage drop across at least one electrical component that is connected in series with one of the constant current sources can advantageously be used for this auxiliary voltage.

In one embodiment, a resistor may be used as the electrical component. Since the current flowing through the resistor is constant, the voltage which is dropped across this resistor is also constant, and may be used as an auxiliary voltage.

In another embodiment, a zener diode can advantageously be used as the electrical component. A zener diode has the advantage that the voltage drop which occurs across it is constant even when the current flowing through the zener diode changes. By way of example, a situation may arise during operation of a relay which requires a change to the switching-on current and/or holding current, and hence appropriate changes to the constant currents. The advantage just mentioned is also applicable when series-connected diodes are used as electrical components.

In the circuit arrangement according to the invention, both constant current sources may, for example, supply a constant current of the same magnitude. In this case, the relay switching-on current is twice the magnitude of the relay holding current.

DETAILED DESCRIPTION OF THE PREFERRED EMBODIMENTS

Figure 1:
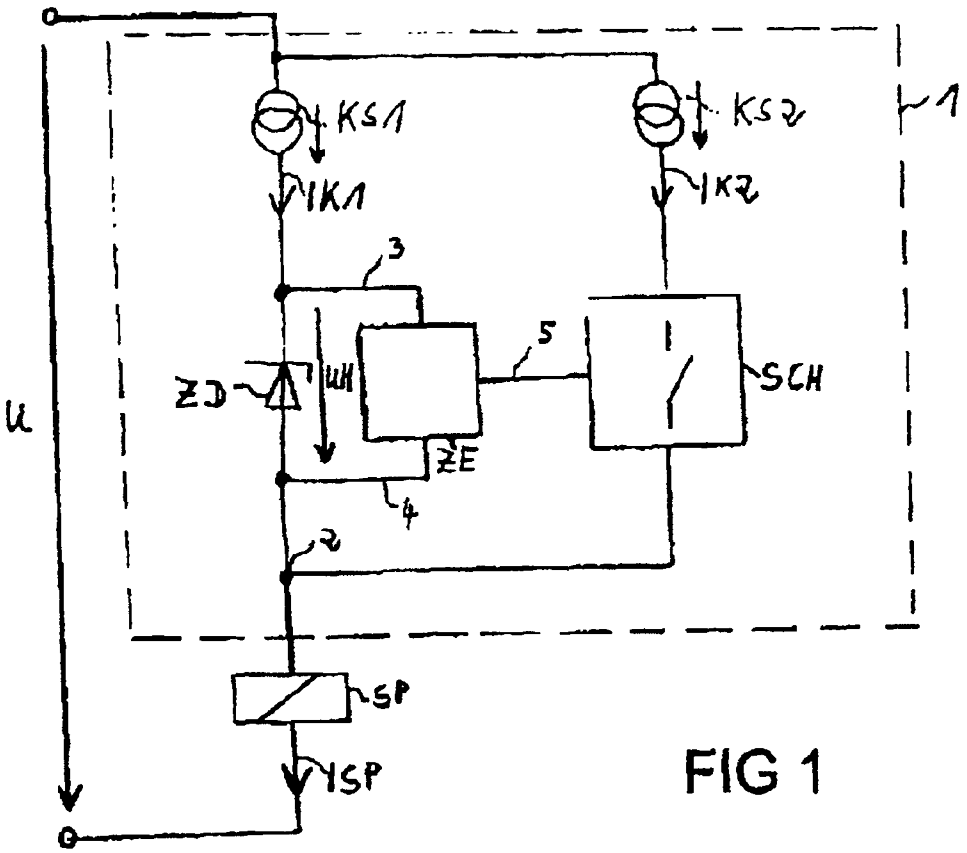
FIG. 1 shows an exemplary embodiment of a cireuit arrangement according to the invention for operation of a relay.

The circuit arrangement 1 illustrated in FIG. 1 for operation of a relay is connected in series with a field coil SP of a relay. A voltage U is applied to the series circuit. The voltage U is a switching voltage, that is to say application of the voltage U is intended to cause the relay to switch. At the same time, the voltage U is used as the operating voltage for the circuit arrangement and the relay. As long as no switching voltage U is applied, the circuit arrangement is in a quiescent state with no current flowing, and a switch SCH is closed.

When the switching voltage U is applied, the circuit arrangement starts to operate. A constant current source KS1 drives a constant current IK1 through a zener diode ZD and through the field coil SP of the relay. Since the switch SCH is closed, a constant current source KS2 also drives a constant current IK2 through the switch. This current is added to the constant current IK1 at a node 2; a current whose magnitude is (IK1+IK2) flows, as a coil current ISP, through the field coil SP of the relay. The constant current source KS1 is designed such that it supplies a constant holding current. The constant current source KS2 supplies the difference to make up the necessary switching-on current for the relay, in this case, the difference is of precisely the same magnitude as the relay holding current. The switching-on current now flows through the field coil SP of the relay and the relay pulls in, that is to say it switches. The constant current IK1 which is flowing through the zener diode ZD results in an auxiliary voltage being dropped across the zener diode ZD, and this is supplied via the conductors 3 and 4 to a timer unit ZE as a supply voltage UTH. When the switching voltage U is applied, the timer unit ZE starts to operate and, after an adjustable time which is greater than the switching-on time of the relay that is being used, opens the switch SCH via a link 5. Since the switch SCH Since the switch SCH is open, the constant current IK2 from the constant current source KS2 can no longer flow. Rather, the constant current IK1 from the constant current source KS1 flows through the field coil SP of the relay, as a holding current. This means that, once the switching-on process has been completed, the holding current is applied to the field coil SP and, in this case, this holding current is half the relay switching-on current.

Thus, during the switching-on process, the constant current IK1 from the constant current source KS1 and the constant current IK2 from the constant current source KS2 flow through the relay with the field coil SP. After completion of the switching-on process, the constant current IK1 from the constant current source KS1 flows through the relay. The magnitude of the currents IK1 and IK2 is governed by the constant current sources KS1 and KS2. Any discrepancies, for example between the coil parameters and their nominal values, do not influence the magnitude of the currents.

Since the currents IK1 and IK2 which are present are constant, the voltage drops across the field coil SP of the relay and across the zener diode ZD are also constant. If the circuit arrangement is operated with switching voltages U of different magnitude, then the difference between the switching voltage U and the voltage drops just mentioned is dropped across the constant current sources KS1 and KS2. The circuit arrangement can thus be operated from a switching voltage U which varies within wide limits but without any change to the magnitude of the relay switching-on current or the relay holding current.

When the circuit is disconnected from the switching voltage U, the circuit changes back to its quiescent state, with no current flowing. The timer unit ZE is reset, and the switch SCH is closed. The relay changes back to its quiescent position. Immediately after completion of these processes, the circuit can be actuated by applying a switching voltage U once again.

Figure 2:
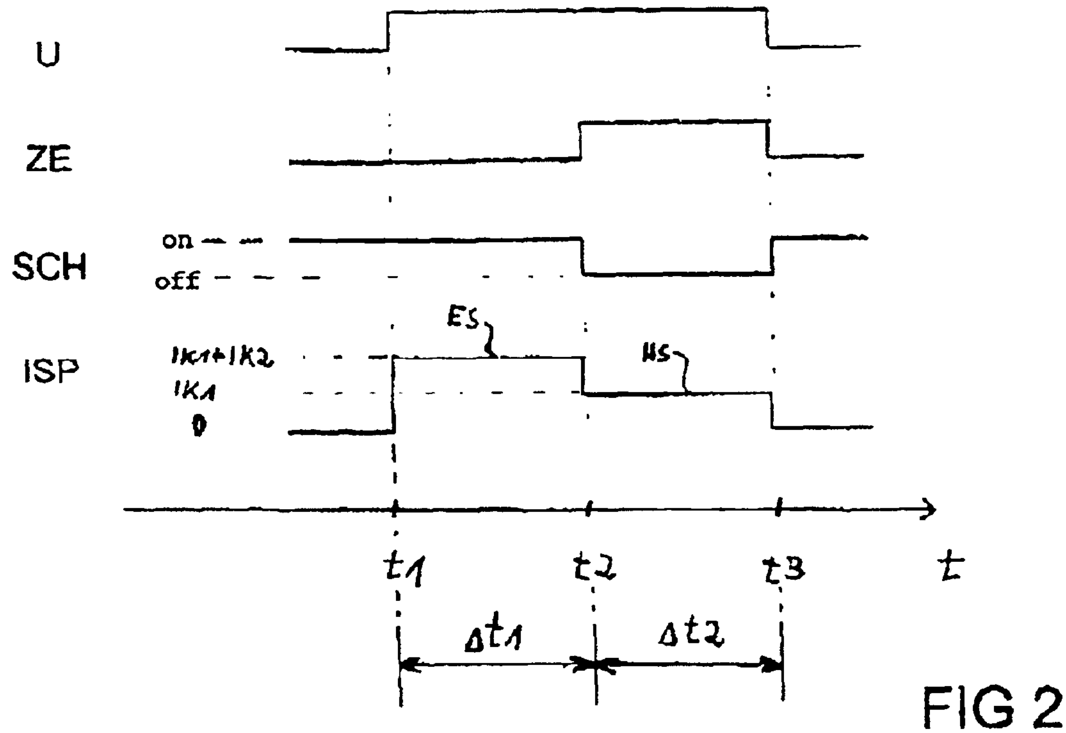
FIG. 2 shows a diagram of the state of elements in the circuit arrangement, plotted against time.

The state of the switching voltage U is shown at the top of the diagram in FIG. 2, with the state of the output from the timer unit ZE being shown underneath this, followed by the state of the switch SCH and, underneath this, the profile of the coil current ISP, plotted against time. Three times t1, t2 and t3 are marked on a horizontal time axis. The switching voltage U is applied to the circuit arrangement at the time t1; the time (t1), which is predetermined by the timer unit ZE, lapses at the time t2, and the circuit arrangement is disconnected from the switching voltage U once again at the time t3.

During the time interval between the times t1 and t2, the switching voltage U is applied to the circuit arrangement, the timer unit is operating, and the time which is predetermined by the timer unit is counting down; the switch is switched on, and a coil current ISP, which is composed of the sum of the constant currents IK1 and IK2, flows through the relay. This coil current is the switching-on current ES.

The switching voltage is likewise applied to the circuit arrangement in the time interval between the times t2 and t3. The timer unit switches off the switch SCH at the time t2, and the current IK1, which forms the holding current HS, flows through the relay, as the coil current ISP.

The circuit is in the quiescent state, with no current flowing, at times before t1 and at times after t3

The circuit can drive a relay reliably over a wide temperature range, since the constant current sources KS1 and KS2 provide the constant currents IK1 and IK2 irrespective of the temperature level. Temperature-dependent changes in the resistance of the field coil SP likewise do not influence the current levels. Since the constant holding current during the holding period of the relay is less than the constant switching-on current (for example half of it), the circuit arrangement requires a fraction (for example approximately half) of the energy which would be required for operation just with a current of the same magnitude as the switching-on current. The power losses are reduced, the thermal loads on the relay are reduced, and the life of the relay coil is increased.

What is claimed is:

1. A circuit arrangement for a relay, comprising a single voltage at which a relay switching-on current is provided for a time which is predetermined by the timer unit, and at which a relay holding current, which is less than the relay switching-on current, is provided for a subsequent holding period, wherein the single voltage is a switching voltage, and the relay switching-on current and the relay holding current are constant currents, which are supplied from at least one constant current source which is fed by the switching voltage.

2. The circuit arrangement as claimed in claim 1, wherein a constant current source, whose constant current magnitude is variable, supplies both the relay switching-on and the relay holding current.

3. The circuit arrangement as claimed in claim 1, wherein a first constant current source provides the relay holding current during the time which is predetermined by the timer unit and during the subsequent holding period, and a second constant current source provides a constant current, which is superimposed on the relay holding current in order to form the relay switching-on current, during the time which is predetermined by the timer unit.

4. The circuit arrangement as claimed in claim 3, wherein a switch, which is located in a current path of the constant current provided by the second constant current source, and is closed during the time which is predetermined by the timer unit.

5. The circuit arrangement as claimed in claim 1, wherein an auxiliary voltage for operation of the timer unit, is dropped across at least one electrical component which is connected in series with one of the constant current sources.

6. The circuit arrangement as claimed in claim 4, wherein an auxiliary voltage for operation of the switch is dropped across at least one electrical component which is connected in series with one of the constant current sources.

7. The circuit arrangement as claimed in claim 5, wherein the electrical component is a resistor.

8. The circuit arrangement as claimed in claim 5, wherein the electrical component is a zener diode.

9. The circuit arrangement as claimed in claim 5, wherein the electrical components are series-connected diodes.

10. The circuit arrangement as claimed in claim 1, wherein the two constant current sources provide constant current of equal magnitude.

11. The circuit arrangement as claimed in claim 6, wherein the electrical component is a resistor.

12. The circuit arrangement as claimed in claim 6, wherein in the electrical component is a zener diode.

13. The circuit arrangement as claimed in claim 6, wherein in the electrical component are series-connected diode.

* * * * *